US012277066B2

(12) United States Patent  
Liu et al.

(10) Patent No.: US 12,277,066 B2  
(45) Date of Patent: Apr. 15, 2025

(54) DYNAMIC MANAGEMENT OF LARGER PAGES DURING RUNTIME

(71) Applicant: INTERNATIONAL BUSINESS MACHINES CORPORATION, Armonk, NY (US)

(72) Inventors: Dong Hui Liu, Beijing (CN); Jing Lu, Beijing (CN); Peng Hui Jiang, Beijing (CN); Naijie Li, Beijing (CN); Xiao Yan Tang, Beijing (CN); Bao Zhang, Beijing (CN); Jun Su, Beijing (CN); Yong Yin, Beijing (CN); Jia Yu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 121 days.

(21) Appl. No.: 18/085,706

(22) Filed: Dec. 21, 2022

(65) Prior Publication Data  
US 2024/0211409 A1 Jun. 27, 2024

(51) Int. Cl.  
*G06F 3/00* (2006.01)  
*G06F 12/00* (2006.01)  
(Continued)

(52) U.S. Cl.  
CPC ...... *G06F 12/1009* (2013.01); *G06F 12/0882* (2013.01); *G06F 12/1027* (2013.01)

(58) Field of Classification Search  
CPC ............. G06F 12/1009; G06F 12/0882; G06F 12/1027  
(Continued)

(56) References Cited

U.S. PATENT DOCUMENTS 7,895,410 B1 * 2/2011 Wu ..................... G06F 12/1009  
711/208  
8,464,023 B2 * 6/2013 Devendran ............ G06F 12/10  
711/206  
(Continued)

FOREIGN PATENT DOCUMENTS

CN 107193646 9/2017  
TW 202236081 9/2022

OTHER PUBLICATIONS

Guo et al., "SmartMD: A High Performance Deduplication Engine with Mixed Pages", 2017 USENIX Annual Technical Conference, Jul. 12-14, 2017; 13 Pages.  
(Continued)

*Primary Examiner* — Sheng Jen Tsai  
(74) *Attorney, Agent, or Firm* — Jared Chaney; Andrew D. Wright; Calderon Safran & Wright P.C.

(57) ABSTRACT

A method, including: monitoring resource utilization of an operating system (OS) with applications utilizing larger pages; determining the monitored resource utilization is greater than a threshold resource utilization; in response to the determining the monitored resource utilization is greater than a threshold resource utilization, determining a respective larger pages index value for each of the applications utilizing larger pages; and turning off larger pages utilization of a subset of the applications utilizing larger pages, wherein the subset comprises a predefined number of the applications utilizing larger pages that have highest determined larger pages index values.

25 Claims, 8 Drawing Sheets

(51) Int. Cl.
*G06F 12/0882* (2016.01)
*G06F 12/1009* (2016.01)
*G06F 12/1027* (2016.01)
*G06F 13/00* (2006.01)

(58) Field of Classification Search
USPC ......................................................... 711/206
See application file for complete search history.

(56) References Cited

U.S. PATENT DOCUMENTS

| | | | | |
|---|---|---|---|---|
| 9,424,201 | B2* | 8/2016 | Duluk, Jr. | G06F 12/1009 |
| 10,706,147 | B1* | 7/2020 | Pohlack | H04L 63/1416 |
| 10,742,763 | B2* | 8/2020 | Velusamy | G06F 16/9577 |
| 11,126,573 | B1* | 9/2021 | Rohleder | G06F 13/1668 |
| 11,422,947 | B2* | 8/2022 | Campbell | G06F 12/1045 |
| 11,543,988 | B1* | 1/2023 | Ramanathan | G06F 3/0604 |
| 2007/0136506 | A1* | 6/2007 | Traut | G06F 9/45504 |
| | | | | 711/6 |
| 2009/0182976 | A1* | 7/2009 | Agesen | G06F 12/1009 |
| | | | | 711/E12.059 |
| 2010/0138587 | A1* | 6/2010 | Hutson | G06F 12/0607 |
| | | | | 711/E12.001 |
| 2011/0145541 | A1* | 6/2011 | Ito | G06F 12/1009 |
| | | | | 711/E12.059 |
| 2011/0258043 | A1* | 10/2011 | Ailaney | G06Q 30/0241 |
| | | | | 715/251 |
| 2012/0054466 | A1* | 3/2012 | Devendran | G06F 12/10 |
| | | | | 711/E12.001 |
| 2012/0110236 | A1* | 5/2012 | Ali | G06F 12/1009 |
| | | | | 711/6 |
| 2013/0080910 | A1* | 3/2013 | Bingell | G06F 16/435 |
| | | | | 715/744 |
| 2014/0040577 | A1* | 2/2014 | Gheith | G06F 12/023 |
| | | | | 711/E12.059 |
| 2014/0281297 | A1* | 9/2014 | Duluk, Jr. | G06F 12/08 |
| | | | | 711/159 |
| 2014/0281324 | A1* | 9/2014 | Duluk, Jr. | G06F 3/0683 |
| | | | | 711/165 |
| 2015/0363325 | A1* | 12/2015 | Baskakov | G06F 12/12 |
| | | | | 711/173 |
| 2015/0363326 | A1* | 12/2015 | Baskakov | G06F 12/12 |
| | | | | 711/173 |
| 2017/0123735 | A1* | 5/2017 | Hom | G06F 3/0656 |
| 2017/0228155 | A1* | 8/2017 | Shirota | G06F 3/061 |
| 2018/0026913 | A1* | 1/2018 | Balle | G02B 6/4452 |
| 2018/0150125 | A1* | 5/2018 | HomChaudhuri | G06F 13/4282 |
| 2018/0329374 | A1* | 11/2018 | Kelly | G06Q 10/04 |
| 2019/0266000 | A1* | 8/2019 | Tsirkin | G06F 9/45558 |
| 2019/0266099 | A1* | 8/2019 | Tsirkin | G06F 9/45558 |
| 2019/0370356 | A1* | 12/2019 | Kucherov | G06F 16/907 |
| 2019/0370357 | A1* | 12/2019 | Kucherov | G06F 16/9014 |
| 2019/0391851 | A1* | 12/2019 | Franciosi | G06F 9/5077 |
| 2021/0240356 | A1 | 8/2021 | Nassi et al. | |
| 2021/0248085 | A1* | 8/2021 | Bian | G06F 12/0882 |
| 2022/0011843 | A1 | 1/2022 | MacNamara et al. | |
| 2022/0050792 | A1* | 2/2022 | Campbell | G06F 12/1045 |
| 2022/0214926 | A1* | 7/2022 | Akiyama | H04L 41/0897 |
| 2022/0327063 | A1* | 10/2022 | Enrici | H03K 19/17728 |
| 2023/0023452 | A1* | 1/2023 | Baskakov | G06F 3/0679 |
| 2023/0195533 | A1* | 6/2023 | Baskakov | G06F 12/1009 |
| | | | | 718/105 |
| 2023/0367773 | A1* | 11/2023 | Kondiles | G06F 16/24542 |
| 2024/0134805 | A1* | 4/2024 | Li | G06N 20/00 |
| 2024/0232098 | A9* | 7/2024 | Li | G06F 12/1027 |

OTHER PUBLICATIONS

Cao et al., "Efficient Huge Page Management with Xpage", 2021 IEEE International Conference on Big Data (Big Data), 2021; pp. 1317-1326.

Kwon et al., "Coordinated and Efficient Huge Page Management with Ingens", 12th USENIX Symposium on Operating Systems Design and Implementation, Nov. 2-4, 2016; 20 Pages.

MongoDB, "Disable Transparent Huge Pages(THP)", https://www.mongodb.com/docs/manual/tutorial/transparent-huge-pages/, Accessed Aug. 9, 2022; 10 Pages.

Shi et al., "Dynamic Page Size Adjustment in Operating System", 2016 International Conference on Information System and Artificial Intelligence, 2016; pp. 24-28.

Red Hat, "How to use, monitor, and disable transparent hugepages in Red Hat Enterprise Linux 6 and 7?", https://access.redhat.com/solutions/46111, May 1, 2022; 8 Pages.

Oracle, "Very Large Memory and HugePages", http://www.oracle.com/webapps/redirect/signon?nexturl=https://docs.oracle.com/cd/E11882_01/server.112/e10839/appi_vlm.htm, 2017; 9 Pages.

Li et al., "Thinking About a New Mechanism for Huge Page Management", APSys '19, Aug. 19-20, 2019; pp. 40-46.

* cited by examiner

DYNAMIC MANAGEMENT OF LARGER PAGES DURING RUNTIME

BACKGROUND

Aspects of the present invention relate generally to heap memory management during runtime of applications and, more particularly, to dynamic utilization of larger pages management during runtime of applications of an operating system (OS).

Use of larger pages in heap memory management is often provided as a solution for high performance computing applications or memory-access intensive applications using large amounts of virtual memory. However, larger pages implementation normally requires particular implementation methods that do not allow for dynamic tuning of its use by an OS. Larger pages include huge pages on Linux systems, superpages in FreeBSD, and large pages on other mainframe systems. Although the below descriptions may use huge pages or large pages as examples, these specific descriptions are simply examples of larger pages and may be interchangeable. Huge pages allow the use and definition of 1 GB page sizes rather than a standard page size of 4 KB. Huge pages reduce OS maintenance of page states by reducing the number of pages that are loaded by the kernel. For example, when small page sizes are used, the kernel needs to load more pages thus resulting in more overhead with access and maintenance of mapping between virtual memory and physical addresses. Further, use of huge pages increases translation lookaside buffer (TLB) cache hit ratios, where the TLB cache is an address-translation cache storing recent translations of virtual memory to physical memory. The TLB cache hit ratio is a percentage of times that a page number is found in the address-translation cache. Utilizing larger pages will result in lower miss rates and subsequently higher hit rates because the page size utilizes a larger virtual memory range for mapping the virtual memory to physical memory addresses and the TLB cache can access memory quicker when more memory is mapped in a single page. These larger page sizes benefit the overall system performance with less load on the kernel, and oftentimes, especially in memory-access intensive applications, more efficient use of virtual memory. This can benefit the OS with many different applications utilizing larger pages on the OS.

There are multiple ways to setup, use, and manage use of larger pages including reservation of larger pages and the use of transparent huge pages (THP). Reserving larger pages allocates a large number of memory pages with a consecutive physical address for these reserved larger pages. However, reserved pages can only be used with larger page allocations and must be pre-allocated for application use. This reserving is done through code added to the application being run on the OS and is a way to setup the use of larger pages that is inflexible.

Additionally, utilizing THP is an abstraction layer that automates creating, managing, and use of huge pages. On a system with THP, when a page fault occurs, THP tries to find a block with 512 contiguous physical pages (2 MB) in a buddy system. However, as the system ages, there will be many fragments in memory space, thus THP has to enable time-consuming memory compactions to create a huge page. In extreme cases, where the compaction operation fails due to unmovable pages, THP can only return a basic 4 KB page but will result in a long latency between the call and return due to accessing large amounts of fragmented memory.

Other issues with both larger pages and THP include memory bloating. For example, if only a small amount of memory is used, but an allocation of a huge page memory is used, then a large amount of memory goes unused and is wasted. In this situation, it becomes necessary to monitor and be aware of huge page utilization at runtime as memory bloating wastes a large amount of memory. In cases where memory is limited, huge pages can be turned off dynamically and then other applications can use the huge pages. Flexible and dynamic memory mechanisms adapt the appropriate policy according to the workload patterns and memory system's status at runtime. Thus, many of the disadvantages of use are related to the inflexibility of larger pages utilization, and dynamically and automatically managing larger pages is important to address these issues with use of larger pages.

SUMMARY

In a first aspect of the invention, there is a computer-implemented method including: monitoring, by a processor set, a resource utilization of an operating system (OS) with applications utilizing larger pages; determining, by the processor set, the monitored resource utilization is greater than a threshold resource utilization; in response to the determining the monitored resource utilization is greater than a threshold resource utilization, determining, by the processor set, a respective larger page index value for each of the applications utilizing larger pages; and turning off, by the processor set, larger pages utilization of a subset of the applications utilizing larger pages, wherein the subset comprises a predefined number of the applications utilizing larger pages that have highest determined larger pages index values.

In embodiments, the method includes identifying a feature of an application; collecting data associated with the feature; and labeling the feature automatically with the predicted larger page allocation. In this manner, implementations of the invention advantageously provide for larger page allocations for applications. In embodiments, the method includes: wherein the determining the respective larger page index value comprises using a larger page close algorithm that is based on a predicted larger page allocations of an application, a priority weight of the applications, a memory efficiency of the applications, and a response time to goal of the applications. In this manner, implementations of the invention advantageously provide for sorting of applications in the index based on the larger page close algorithm and iteration when resource utilization is not below a threshold. In embodiments, the method includes: training a machine learning (ML) model to predict the larger page allocation based on the static application feature and the runtime feature. In this manner, implementations of the invention advantageously provide for a machine learning model for better determination of larger page allocations of applications based on the features of the applications. In embodiments, the method includes: training the ML model to dynamically manage a large page lifecycle of the applications of the OS. In this manner, implementations of the invention advantageously provide an ML model that dynamically manages larger page lifecycle.

In another aspect of the invention, there is a computer program product including one or more computer readable storage media having program instructions collectively stored on the one or more computer readable storage media. The program instructions are executable to: identify a feature of an application; label the feature automatically with a larger page allocation; predict the larger page allocation utilizing a machine learning (ML) model based on the feature; build an index of applications utilizing larger pages of an operating system (OS), the index including the applications and corresponding larger page allocations, wherein one of the applications corresponds to the predicted larger page allocation; determine a threshold resource utilization has been exceeded; and select, based on a rule, a subset of the applications to turn off larger pages which reduces the resource utilization of the OS. In this manner, implementations of the invention advantageously provide for determining larger page allocations and building an index table based on the larger page allocations to determine applications utilizing larger pages that should be turned off to reduce resource utilization of the OS.

In embodiments, the computer program product includes: in response to the determining the threshold resource utilization is exceeded, determine a respective larger page index value for each of the applications utilizing larger pages, wherein the determined respective larger page index value comprises using the larger page close algorithm that is based on the predicted larger page allocation, the priority weight, the memory efficiency, and a response time to goal. In this manner, implementations of the invention advantageously provide for sorting the applications utilizing larger pages by the larger page close algorithm to decide which larger page usages should be turned off for more efficient utilizations of OS resources. In embodiments, the index includes the predicted larger page allocation of the one of the applications, a priority weight of the one of the applications, a memory efficiency of the one of the applications, and a response time to goal of the one of the applications. In this manner, implementations of the invention advantageously provide an index for managing applications utilizing larger pages In another aspect of the invention, there is system including a processor set, one or more computer readable storage media, and program instructions collectively stored on the one or more computer readable storage media. The program instructions are executable to: identify static application features of an application; identify runtime features of the application; collect data associated with the runtime feature during runtime of the application; predict a larger page allocation by applying a machine learning (ML) model, the ML model being trained based on other static application features and other runtime features of another application; build an index of applications utilizing larger pages of an operating system (OS), the index including the applications and corresponding larger page allocations, wherein one of the applications corresponds to the predicted larger page allocation; determine a threshold resource utilization has been exceeded; and selecting, based on a rule, a subset of the applications to turn off larger pages which reduces the resource utilization of the OS. In this manner, implementations of the invention advantageously provide for turning off larger pages on select applications to reduce resource utilization on the OS.

In embodiments, the system includes program instructions that are executable to: in response to the determining the threshold resource utilization is exceeded, determine a respective larger page index value for each of the applications utilizing larger pages, wherein the determined respective larger page index value comprises using the larger page close algorithm that is based on the predicted larger page allocation, the priority weight, the memory efficiency, and a response time to goal. In this manner, implementations of the invention advantageously provide sorting the applications utilizing larger pages by the larger page close algorithm to decide which larger page usages should be turned off for more efficient utilizations of OS resources. In embodiments, the index includes the predicted larger page allocation of the one of the applications, a priority weight of the one of the applications, a memory efficiency of the one of the applications, and a response time to goal of the one of the applications. In this manner, implementations of the invention advantageously provide an index for managing applications utilizing larger pages.

In further aspects of the invention, there is a computer-implemented method including: identifying, by a processor set, static application features of an application; identifying, by the processor set, runtime features of the application; collecting, by the processor set, data associated with the runtime feature during runtime of the application; predicting, by the processor set, a larger page allocation of the application by applying a machine learning (ML) model, the ML model being trained based on other static application features and other runtime features of another application; monitoring, by the processor set, a resource utilization of an operating system (OS) with applications utilizing larger pages; building, by the processor set, an index of the applications utilizing larger pages on the OS, the index including the applications and the predicted larger page allocation, wherein one of the applications corresponds to the larger page allocation; determining, by the processor set, a threshold resource utilization has been exceeded by the monitored resource utilization; and balancing, by the processor set, utilization of the larger pages by selecting, based on a rule, a subset of the applications to turn off larger pages which reduces the resource utilization of the OS. In this manner, implementations of the invention advantageously provide for a more efficient utilization of larger pages by an OS running the applications.

In embodiments, the method includes: in response to the determining the threshold resource utilization is exceeded, determine a respective larger page index value for each of the applications utilizing larger pages, wherein the determined respective larger page index value comprises using the larger page close algorithm that is based on the predicted larger page allocation, the priority weight, the memory efficiency, and a response time to goal. In this manner, implementations of the invention advantageously provide for sorting of applications in the index based on the larger page close algorithm. In embodiments, the index includes the predicted larger page allocation of the application, a priority weight of the application, a memory efficiency of the application, and a response time to goal of the application. In this manner, implementations of the invention advantageously provide an index for managing applications utilizing larger pages In further aspects of the invention, there is a computer-implemented method including: identifying, by a processor set, static application features of an application; identifying, by the processor set, runtime features of the application; collecting, by the processor set, data associated with the runtime features during runtime of the application; predicting, by the processor set, a larger page allocation of the application by applying a machine learning (ML) model, the ML model being trained based on other static application features and other runtime features of another application; monitoring, by the processor set, a resource utilization of an operating system (OS) with applications utilizing larger pages; building, by the processor set, an index of the applications utilizing larger pages on the OS, the index including applications and the predicted larger page allocation, wherein one of the applications corresponds to the larger page allocation, determining, by the processor set, a threshold resource utilization has been exceeded by the monitored resource utilization; and balancing, by the processor set, utilization of the larger pages by selecting, based on a rule, a subset of the applications to turn off larger pages which reduces the resource utilization of the OS. In this manner, implementations of the invention advantageously provide for a more efficient utilization of larger pages by an OS running the applications.

In embodiments, the method includes: in response to the determining the threshold resource utilization is exceeded, determine a respective larger page index value for each of the applications utilizing larger pages, wherein the determined respective larger page index value comprises using the larger page close algorithm that is based on the predicted larger page allocation, the priority weight, the memory efficiency, and a response time to goal. In this manner, implementations of the invention advantageously provide for sorting of applications in the index based on a larger page close algorithm.

BRIEF DESCRIPTION OF THE DRAWINGS

Aspects of the present invention are described in the detailed description which follows, in reference to the noted plurality of drawings by way of non-limiting examples of exemplary embodiments of the present invention.

DETAILED DESCRIPTION

Figure 1:
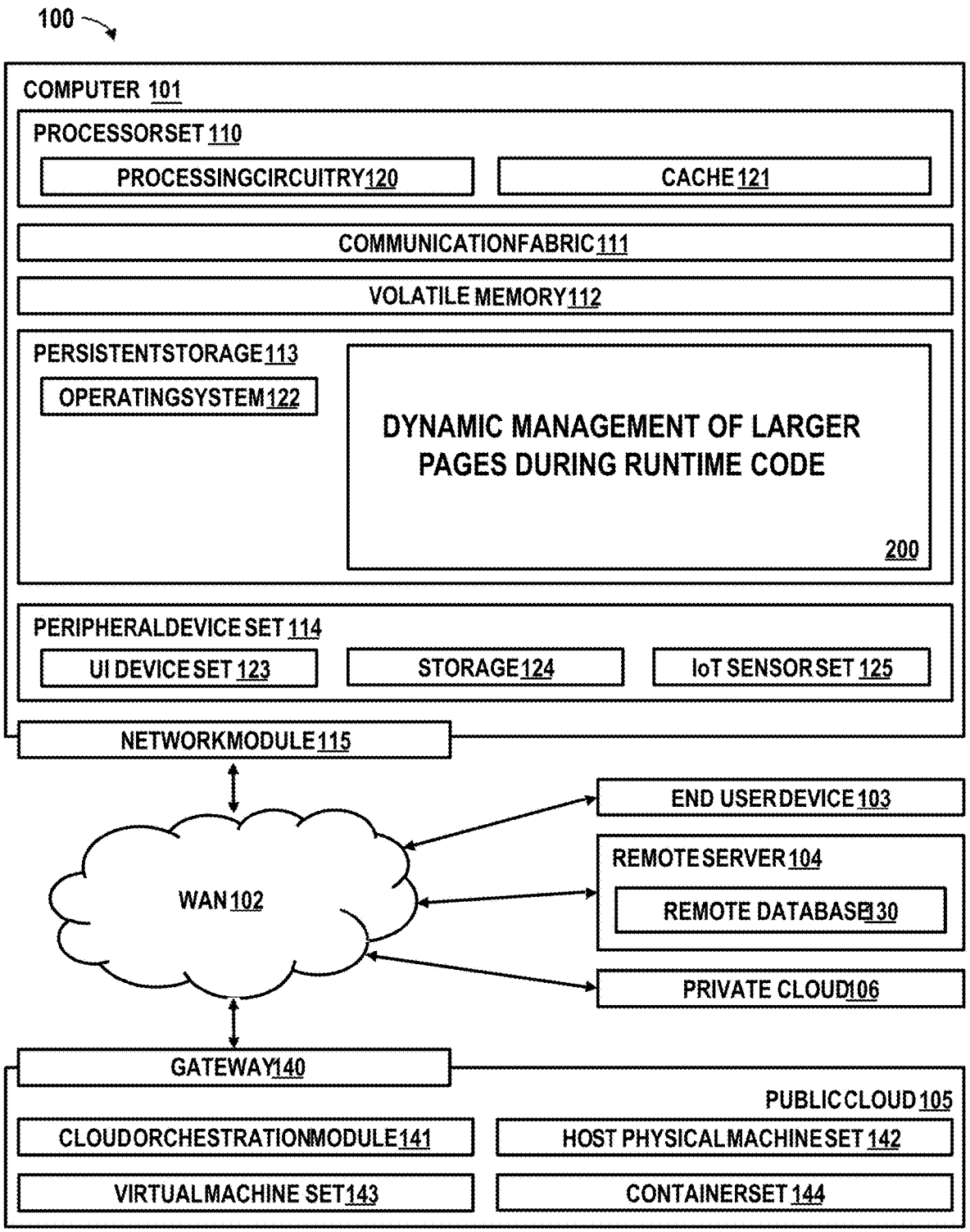
FIG. 1 depicts a computing environment according to an embodiment of the present invention.

Aspects of the present invention relate generally to larger pages management and, more particularly, to dynamic larger page management during runtime of applications of an OS. In embodiments, a computing device uses machine learning (ML) modeling based on a regression modeling for dynamic management of larger pages utilization to reduce resource consumption by applications of an operating system (OS). In this manner, implementations of the invention provide a method of dynamic management of larger pages utilization by applications of an OS. The ML modeling may include a regression modeling to help decide larger page allocations for applications based on features of the applications.

In aspects of the invention there is a method for dynamic large page management to improve performance during runtime. In embodiments, the method includes: automatically building labels for application features by combining static application features and runtime features of an application to decide an appropriate larger page allocation; building an index for each larger page application, and the index is based on a priority weight, a larger page allocation, a memory efficiency and an actual response time to goal; using analytics and a machine learning model based on application features and runtime features to predict the utilization of larger page and dynamically tune the larger page lifecycle among multiple applications in the OS; and introducing selection policies for multiple larger page switches in multiple applications to balance usage of resources of the OS.

Use of larger pages by conventional systems is generally inflexible. Applications utilizing larger pages have turned on the use of larger pages, but do not dynamically turn off larger pages. The larger page utilization may be monitored or tracked, or simply determined based on querying the page size for each application running on the OS. Reserved pages can only be used with larger page allocations and must be pre-allocated for application use. As the system ages, there will be many fragments in memory space which require time consuming defragmenting and in some extreme cases this defragmenting fails and thus results in a long latency between a call and return due to accessing large amounts of fragmented memory. Larger pages also may result in memory bloating. Thus, a flexible and dynamic memory mechanism for utilizing larger pages is needed. Thus, the technical problem with utilization of larger pages lies with the inflexibility of its use. Embodiments of the invention provide a technical solution to this problem by turning off larger pages utilization (i.e., ending a larger pages lifecycle) when resources are low for applications of an OS. In particular the dynamic management of larger pages utilization for applications of the OS balances utilization of resources of the OS. By turning off larger pages when memory resources are low, aspects of the invention change the way a memory system of a computer system or computer environment operates such that the computer system or computer environment, as a whole, may run more efficiently and effectively. In this manner, implementations of the invention provide a technical improvement to memory management of a computing device.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as dynamic management of larger pages during runtime code 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
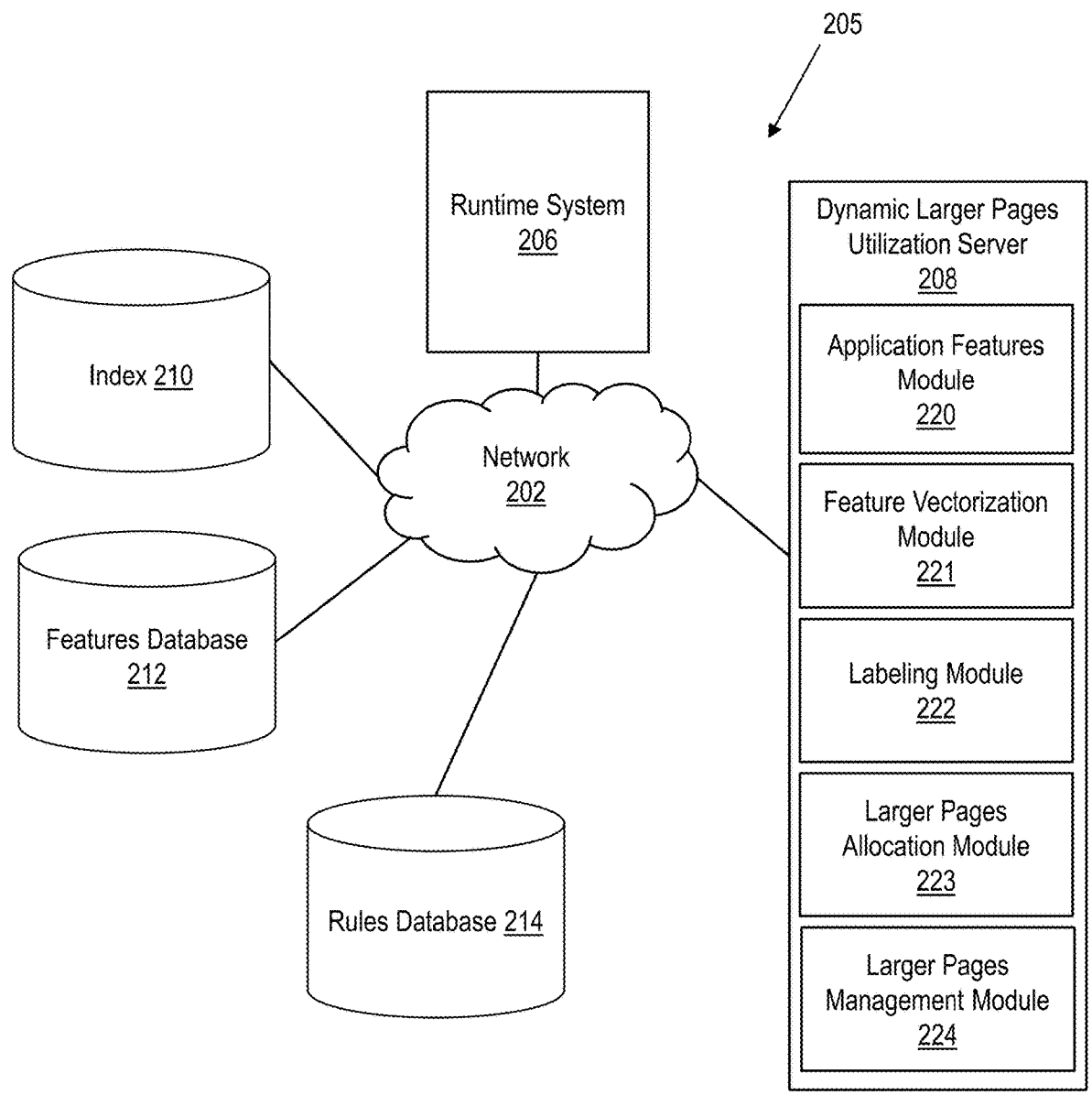
FIG. 2 shows a block diagram of an exemplary environment in accordance with aspects of the invention.

FIG. 2 shows a block diagram of an exemplary environment 205 in accordance with aspects of the invention. In embodiments, the environment 205 includes a network 202 enabling communication between runtime system 206, dynamic larger pages utilization server 208, index database 210, features database 212, and rules database 214. In one example, the runtime system 206 and dynamic larger pages utilization server 208 of FIG. 2 may correspond to the computer 101 of FIG. 1. In another example, the runtime system 206 may correspond to an end user device 103 of FIG. 1 that runs an application and the dynamic larger pages utilization server 208 may correspond to the computer 101 of FIG. 1.

In embodiments, the code in the dynamic larger pages utilization server 208 in FIG. 2 (including program modules in the code) may correspond to the dynamic management of larger pages during runtime code 200 of FIG. 1. In one example, the index database 210, features database 212, and rules database 214 of FIG. 2 may correspond to one or more instances of the remote database 130 of FIG. 1. In another example, the index database 210, features database 212, and rules database 214 may correspond to the storage 124 of FIG. 1. In embodiments, the index database 210, features database 212, and rules database 214 may correspond to other storage locations on one or more of the computer 101, end user device 103, or a remote server 104 of FIG. 1. In embodiments, network 202 of FIG. 2 may correspond to WAN 102 of FIG. 1.

In embodiments, the dynamic larger pages utilization server 208 of FIG. 2 comprises an application features module 220, a feature vectorization module 221, a labeling module 222, a larger pages allocation module 223, and a larger pages management module 224 each of which may comprise modules of the code of block 200 of FIG. 1. These modules of the code of block 200 are executable by the processing circuitry 120 of FIG. 1 to perform the inventive methods as described herein. The dynamic larger pages utilization server 208 may include additional or fewer modules than those shown in FIG. 2. In embodiments, separate modules may be integrated into a single module. Additionally, or alternatively, a single module may be implemented as multiple modules. Moreover, the quantity of devices and/or networks in the environment is not limited to what is shown in FIG. 2. In practice, the environment may include additional devices and/or networks; fewer devices and/or networks; different devices and/or networks; or differently arranged devices and/or networks than illustrated in FIG. 2.

In embodiments, the application features module 220 is configured to identify features associated with applications. In embodiments, the features include static application features and runtime features of the application running on the runtime system 206. These features may be stored and managed in features database 212. In exemplary embodiments, the static application features include external functions, programming language, application size, compiler version, middle ware, database access, application loop counts, application branch counts, application call chain counts, input/output (I/O) resource access, network resource access, number of threads utilized, and heap latch contention.

Each of these static application features may include different identification methods. In exemplary embodiments, application features module 220 identifies external function data by collecting the external function data utilizing an updated binder to accumulate external symbols that count for both static linkages and dynamic linkages. In exemplary embodiments, the application features module 220 collects loop counts, branch counts, and call chain counts by utilizing an updated a compiler to calculate these loop counts, branch counts, and call chain counts based on a static computation graph. In exemplary embodiments, the application features module 220 collects middle ware and database access data utilizing an updated binder to record specific dynamic link library (DLL) information required when the application accesses middle ware and databases during linking. In exemplary embodiments, I/O resource access data is collected by adding a field at the process-level to record I/O resource accessing by the application and thereby keep track of I/O resource access counts. For example, this I/O resource access count may be tracked by updating fopen( ), fread( ), and fwrite( ) system calls by the application to track I/O access counts. In exemplary embodiments, the application features module 220 collects network resource data by adding a field at the process-level to record network resource accessing by the application. For example, this network resource access may be tracked by updating socket( ), connect( ), and shutdown( ) system calls by the application to track active socket counts. In exemplary embodiments, the number of threads utilized is collected by adding a field at the process-level to save the number of threads that are being utilized in the moment by the application (i.e., thread count). This number of threads specifies the number of simultaneous requests being utilized by the application. For example, this thread count may be tracked by updating pthread_create( ) and pthread_exit( ) system calls to track active thread counts being utilized by the application. In exemplary embodiments, heap latch contention data is collected by adding a field at the process-level to record when a heap latch wait queue is used based on an accumulated number of requests by the application to the heap. For example, this number in the heap latch wait queue may be tracked with an update to malloc( ) system calls, thus returning a count of accumulated requesters of shared resources in the heap.

Further, for runtime features of the application, in exemplary embodiments, the application features module 220 collects a page-in/page-out rate, real storage utilization, central processing unit (CPU) utilization, CPU time, translation lookaside buffer (TLB) miss count, and a larger page allocation during runtime of the application. In exemplary embodiments, the page-in/page-out rate is tracked by incrementing a page-in count based on when a storage manager reads a page in the system memory from the swap space of the disk (i.e., memory storage device), and a page-out count when a storage manager writes a page into the system memory from the swap space of the disk along with a time when the count changes. In other words, the page-in/page-out rate indicates the requested resource is not found in a page table of the heap memory.

In embodiments, the feature vectorization module 221 is configured to vectorize identified features of the application for use in the ML modeling. This vectorization of the identified application features may utilize feature engineering. In exemplary embodiments, the feature engineering utilizes algorithms and encoders to translate each identified and extracted feature into a vectorized form. Any such algorithms or encoders that may provide a vectorized output of the identified application features may be used. The vectorized application features are more easily digestible by ML models, however, in some exemplary embodiments, no vectorization may be used. Instead, the ML model may analyze the identified application features and based on knowledge about these application features, may interpret the application features to determine larger pages allocations and larger pages management.

Figure 6:
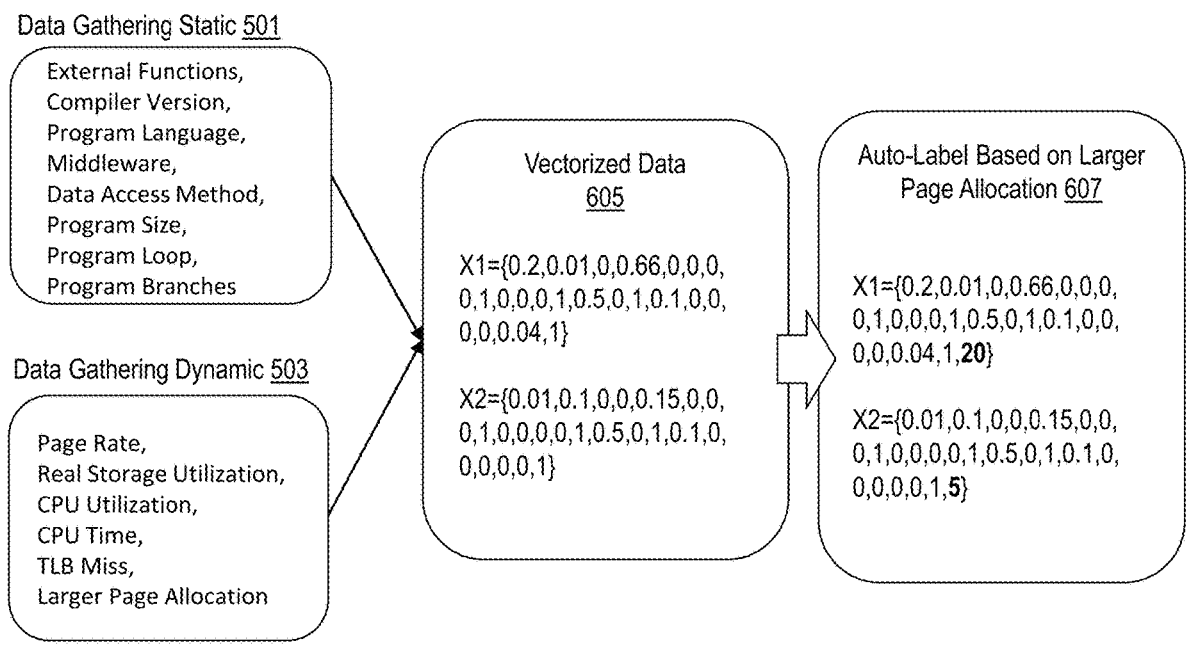
FIG. 6 shows a flowchart showing the vectorization of identified application features of an exemplary method in accordance with aspects of the present invention.

One exemplary embodiment of the vectorization performed by feature vectorization module 221 is shown in the diagram of FIG. 6. For example, an application loading module of the runtime loads the application for analysis by the application features module 220 which identifies application features. These identified features (shown as data gathering static 501 and dynamic 503), e.g., external functions, compiler version, programming language, middle ware, database access methods, application size, application loops, application branches, and application call chains, are analyzed with feature engineering algorithms and encoders to translate the identified features into a vectorized form (i.e., vectorization) 605. In particular, for example, for external functions of the application with different names, a word2vec algorithm may be utilized. Further, a one-hot encoding algorithm may be utilized to translate compiler version data, programming languages data, middle ware data, and data access methods into a vectorized form. For application size, loops, branches, and call chain data from the application code, a normalization of the data into vectorized form may be utilized. In embodiments, the application features may indicate different application scenarios that may affect the importance of the application or the need for memory allocation and/or references by the application. For example, web applications or online transaction applications may not require as much local access to memory resources and thus may not require use of larger pages. Other examples may include batch applications that provide many requests from the runtime system 206 simultaneously and thus may affect memory allocation and increase the need to access resources of the runtime system 206.

Referring back to FIG. 2, in embodiments, the labeling module 222 is configured to identify runtime features and data associated with the runtime features during the runtime of the application on runtime system 206. The labeling module 222 also automatically labels the runtime features with predicted larger page allocations based on the features. The labels may indicate that the key runtime history log entry showing where the larger page allocations should be set (i.e., predicted). In other words, the key runtime history log entry indicates the appropriate time to utilize and allocate larger pages for an application. These key features and larger page allocations are shown in bold in FIG. 6 as seen by the auto-label based on larger page allocation 607.

With continued reference to FIG. 2, in embodiments, the larger pages allocation module 223 is configured to determine a TLB miss threshold that provides the most efficient use of computer resources. In one exemplary embodiment, the larger pages allocation module 223 may utilize ML modeling to determine the larger page allocation that is set for the application during runtime (i.e., the runtime option for larger pages). In exemplary embodiments, the larger pages allocation module 223 may train an ML model that determines larger page allocation for an application and applies the ML model to set larger page allocations for when larger pages are utilized (i.e., turning on the use of larger pages) by the application before runtime and/or also dynamically sets the larger page allocation when changes occur during the runtime of the application. For example, if the runtime log history for the application begins to indicate that fewer memory resources (i.e., page size does not need to grow) are accessed or the access times for memory resources are reduced (i.e., random and discrete access to memory resources) and real storage is sufficient (e.g., utilization below 80%), then the larger page allocation may be increased to speed access to data through larger pages. If the runtime log history begins to indicate that more memory resources are accessed or needed and real storage is insufficient (e.g., utilization above 80%), then the larger pages allocation may be decreased so that the space used by larger pages is reduced.

In embodiments, the larger pages management module 224 is configured to utilize the ML modeling or rules to determine when larger pages of an application should be turned off (i.e., switched off). The ML modeling dynamically manages larger page lifecycle of the application. The rules may be retrieved from rules database 214 and may be used to determine which larger page utilizations by different applications should be turned off. In exemplary embodiments, the rules utilize an algorithm to determine the order from which application use of larger pages is turned off (i.e., the larger page close algorithm order). For example, the rules may include an algorithm emphasizing priority weight of an application over memory efficiency of the application. Or the rules may include an algorithm emphasizing the amount of time to goal, where shorter times are accepted so that more applications using larger pages can resolve their goals before larger pages is turned off (thus potentially having higher resource costs early on, however reducing resource costs at a later point in time).

In one exemplary embodiment, the larger page close algorithm is based on an algorithm utilizing one or more of the predicted larger page allocations for the application, a priority weight of the applications, a memory efficiency of the applications, and/or a response time to goal of the applications. In exemplary embodiments, the predicted larger page allocation for the application may be determined by the ML model or other user selection. In an exemplary embodiment, the priority weight for the application may provide a weighted value of the application based on the type of application or usages. The weighting may be defined in the workload manager (WLM) by the user and adjusted by a resource manager. In exemplary embodiments, memory efficiency may be calculated by runtime via allocated virtual storage and real storage utilized by larger pages of the application. In exemplary embodiments, actual response time to goal includes the proportion of real response time and response time goal of the application. For example, the goal of the application may be to provide a response to a query within 1 second but actual response time may be 2 seconds. Then the response time goal is not met. If, for example, the response time goal is not met and priority weight is low, then the application has little value to the OS and larger pages can be closed. Also, larger pages may close depending on the resource utilization of the application. This set of applications may be sorted in an index based on a larger page close algorithm. For example, if an application has high memory usage, then it is advantageous to close/turn off the larger pages to save those resources for other uses/applications. If an application has low memory usage, then there is no need to turn off larger pages since not many resources are saved. The larger page close algorithm may, for example, utilize the following equations: actual response time goal:

$$r = W_{category} * \frac{\text{actual time}}{\text{goal time}};$$

larger page close algorithm:

$$I = \frac{x}{rwz};$$

and selection of the application which has the highest larger page index: Y=Top$_k$ (l$_1$, l$_2$, l$_3$, . . . , l$_n$) where x is the predicted larger page allocation; w is the priority weight of the application; w$_{category}$ is the priority weight of a type of application, and z is the memory efficiency of the application. When r<1 the goal is met, when r>1 the goal is missed. The rules may be applied to applications in the index. However, in other exemplary embodiments, the index may itself be sorted by the larger page close algorithm. In embodiments, the index may also be in a table form. For example, the index may comprise a table that includes a determined index value of each application utilizing larger pages, the determined values being based on the larger page close algorithm "I" described above.

Figure 3A:
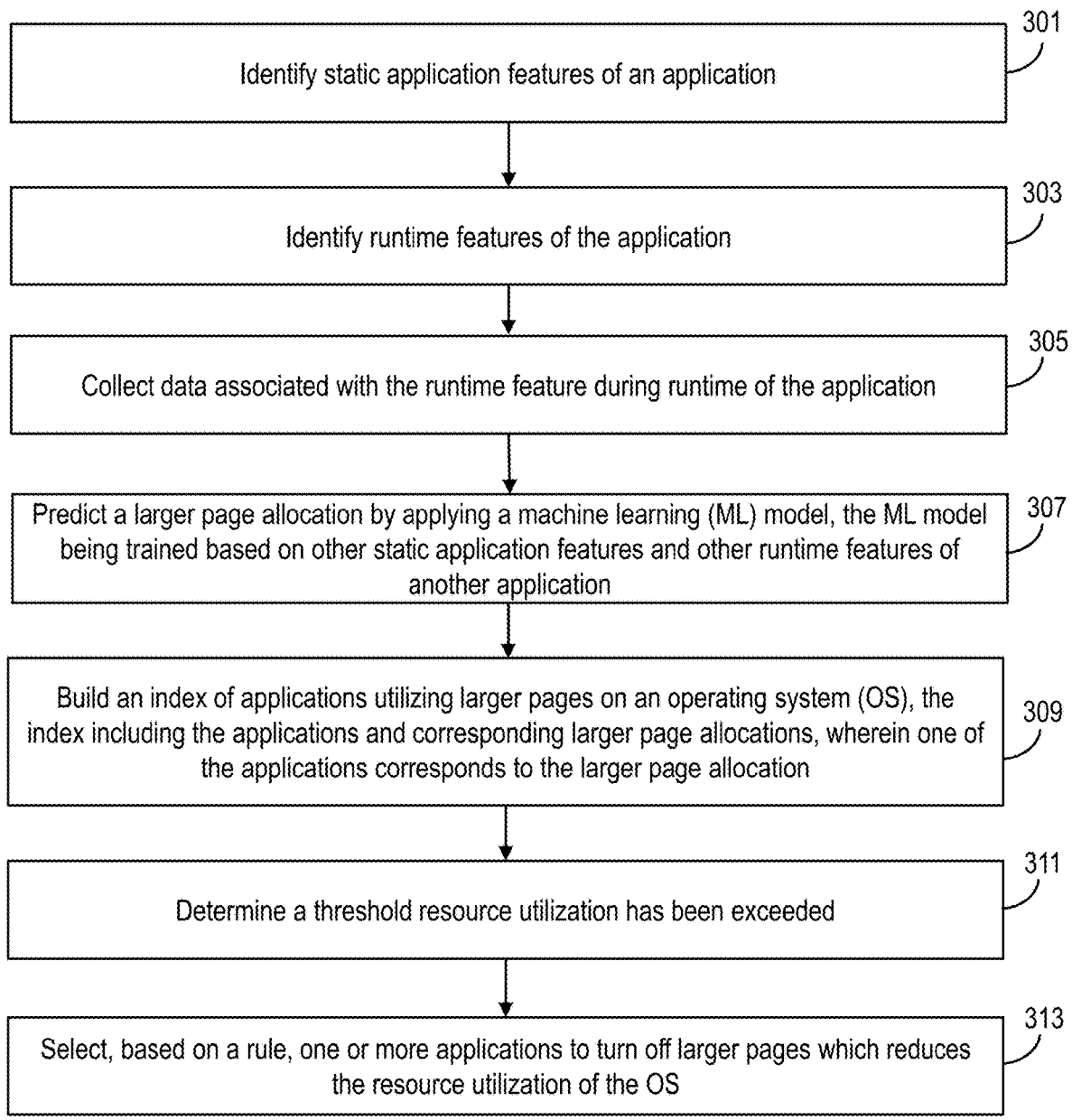
FIG. 3A shows a flowchart of an exemplary method in accordance with aspects of the invention.

FIG. 3A shows a flowchart of an exemplary method in accordance with aspects of the present invention. Steps of the method may be carried out in the environment of FIG. 2 and are described with reference to elements depicted in FIG. 2.

At step 301, the dynamic larger pages utilization server 208 of FIG. 2 identifies static application features of an application. In embodiments, and as described with respect to FIG. 2, the static application features of the application are identified by the application features module 220. These static application features include external functions of the application, programming language utilized by the application, application size, compiler version of the application, middle ware, database access methods, application loop count, application branch counts, application call chain counts, I/O resource access, network resource access, number of threads, and heap latch contention of the application. The static application features may be identified and collected by updating the compiler, binder, and on a process-level of the application to track and record the static application features. Each of the static features may involve a different recording and/or tracking method.

At step 303, the dynamic larger pages utilization server 208 of FIG. 2 identifies runtime features of the application. In embodiments, and as described with respect to FIG. 2, the application features module 220 may also be used to identify the runtime features of the application. The runtime features may be identified and collected during runtime of the application on the runtime system 206 as seen in FIGS. 4A and 4B. For example, during runtime, features of the application may be identified as application features/activities that occur during runtime. However, data regarding those features are additionally separately collected. For example, the runtime features may include at least a page-in/page-out rate, real storage utilization percentage of the application, CPU utilization, TLB miss count, and larger page allocation, and data regarding those features are additionally/separately collected during runtime.

At step 305, the dynamic larger pages utilization server 208 of FIG. 2 collects data associated with the runtime feature during runtime of the application. In embodiments, and as described with respect to FIG. 2, the application is executed on the runtime system 206. In exemplary embodiments, the runtime features include a combination of associated runtime features and static application features that represent the application process at a snapshot of the application during runtime. The snapshot may represent the larger page allocation. The runtime features may be auto labeled to indicate a larger pages allocation and real storage cost to the overall runtime system 206. This allows the dynamic larger pages utilization server 208 to turn on larger pages early enough to reduce future TLB miss counts, but late enough to decrease real storage costs that do not increase page-in/page-out costs. The label may indicate a larger pages allocation that balances the TLB hit ratio and real storage costs. In accordance with aspects of the invention, this prediction of larger page allocation, at step 307, may utilize the ML model to determine larger pages allocation based on the application features (i.e., static application features and runtime features).

At step 309, the dynamic larger pages utilization server 208 of FIG. 2 builds an index that may be stored in the index database 210. In embodiments, the index database 210 stores one or more indexes, and each index comprises a data structure such as an index table that includes index values. Each index value may include information associated with each application of the OS. In exemplary embodiments, and as described with respect to FIG. 2, the index values of the index table include values generated by the larger page close algorithm "I" described above. In embodiments, the index table may include the index values and data associated with the applications utilizing larger pages including the application, corresponding larger page allocation for the application, features, a priority weight of each of the applications, a memory efficiency of each of the applications, and a response time to goal of each of the applications. For example, in an instance where particular applications are prioritized, memory utilization is good and response time to goals is minimal, the larger pages on the particular application in question is kept over an application that has no need for larger pages. In embodiments, the index value may be based on one or more of a predicted larger page allocation of each application, a priority weight of each of the applications, a memory efficiency of each of the applications, and a response time to goal of each of the applications. In embodiments, the trained ML model may include only training data for the application that is being dynamically tuned. This data may require additional runtime of the application to specifically train the ML model, however, could be done in a virtual environment with similar settings as the runtime system 206. In other embodiments, the trained ML model may include training data from another application with similar application features that is executed on a similar runtime system. The ML model may compare these other application features and other runtime systems to determine whether the instant application and runtime system 206 approximates one another, or whether interpolation of the larger pages allocation is necessary.

At step 311, the dynamic larger pages utilization server 208 of FIG. 2 determines a threshold resource utilization has been exceeded. For example, when resource utilization refers to real storage utilization, the threshold may be defined as when the OS shows signs that real storage utilization of the OS is above 80% of OS total memory.

At step 313, the dynamic larger pages utilization server 208 of FIG. 2 selects, based on a rule, one or more applications to turn off larger pages. For example, when turning off the larger pages on these applications, the resource utilization is reduced until utilization of the real storage reduces to below the threshold. In embodiments, the one or more applications may be a predefined number of applications to reduce the resource utilization below the threshold. This predefined number of applications may be a subset of the applications utilizing larger pages. In embodiments resource utilization may include CPU utilization percentage, and reduction of utilization of the CPU is determined by the highest CPU utilization during a predefined period of time.

Figure 3B:
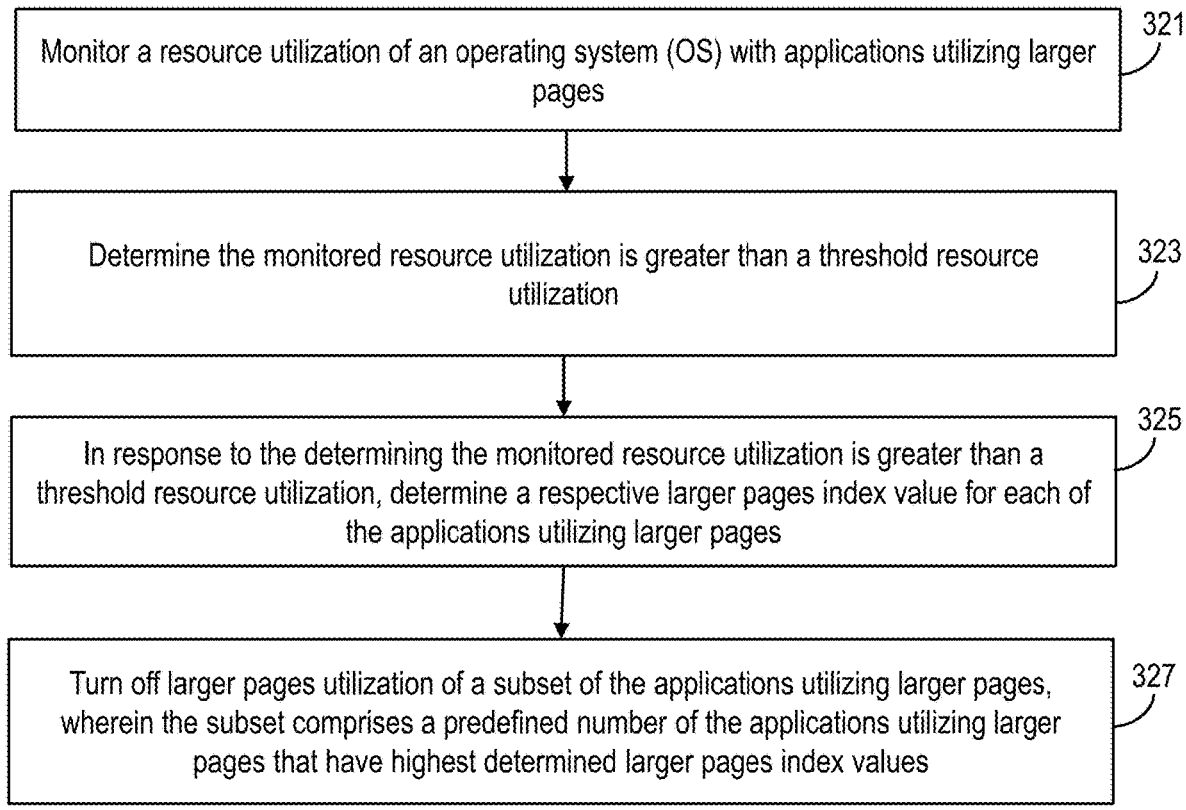
FIG. 3B shows a flowchart of an exemplary method in accordance with aspects of the invention.

FIG. 3B shows a flowchart of an exemplary method in accordance with aspects of the present invention. Steps of the method may be carried out in the environment of FIG. 2 and are described with reference to elements depicted in FIG. 2.

At step 321, the dynamic larger pages utilization server 208 of FIG. 2 monitors a resource utilization of an OS that has applications utilizing larger pages. In embodiments, the resources such as real storage utilization, CPU utilization, and other aggregated OS resource utilization may be monitored to determine whether the system as a whole, would run more efficiently and effectively. For example, real storage utilization may show a system is utilizing over 80% of the overall system storage. A reduction in this storage utilization may then allow better/faster processing of particular applications by the OS. Thus, the dynamic larger pages utilization server 208 will move to step 323.

At step 323, the dynamic larger pages utilization server 208 of FIG. 2 determines the monitored resource utilization is greater than a threshold resource utilization. For example, in the previous example of real storage utilization exceeding 80% of the overall system storage, the threshold resource utilization may be 75% utilization of real storage of the system. Thus, the dynamic larger pages utilization server 208 will move to step 325.

At step 325, in response to the determining the monitored resource utilization is greater than a threshold resource utilization of step 323, the dynamic larger pages utilization server 208 of FIG. 2 determines a respective larger pages index value for each of the applications utilizing larger pages. In embodiments, the determination that the threshold resource utilization is exceeded indicates that the OS may need to reduce resource utilization to run the overall system more efficiently and effectively. Thus, to determine which of the applications utilization larger pages should have larger pages turned off, a larger pages index value is provided to each of the applications. In embodiments, the larger pages index value is based on a larger pages close algorithm accounting for a plurality of factors. These factors may include a predicted larger page allocation of each application, a priority weight of each of the applications, a memory efficiency of each of the applications, and a response time to goal each of the applications.

At step 327, the dynamic larger pages utilization server 208 of FIG. 2 turns off larger pages utilization of a subset of the applications utilizing larger pages, wherein the subset comprises a predefined number of the applications utilizing larger pages that have highest determined larger pages index values. The higher the larger pages index value, the more likely the application is selected either because larger pages utilization is for a low priority application, the goal of the application is not being met, the application is not efficiently using memory, and/or larger page allocation is very high. In any event, any of these factors from step 325 may be used to determine which of a subset of the applications should have larger pages turned off. In exemplary embodiments, the subset of applications may be predetermined/set by a user (e.g., three applications may be selected at one time to turn off larger pages and attempt to reduce resource utilization below the threshold). In exemplary embodiments, as many applications as necessary may be selected for the subset of applications to reduce resource utilization below the threshold. In exemplary embodiments, an iterative selection process is made to turn off the use of larger pages by one or two applications, check whether the resource utilization is below the threshold and if not below the threshold, one or two more applications may be selected until the resource utilization is below the threshold.

Figure 4:
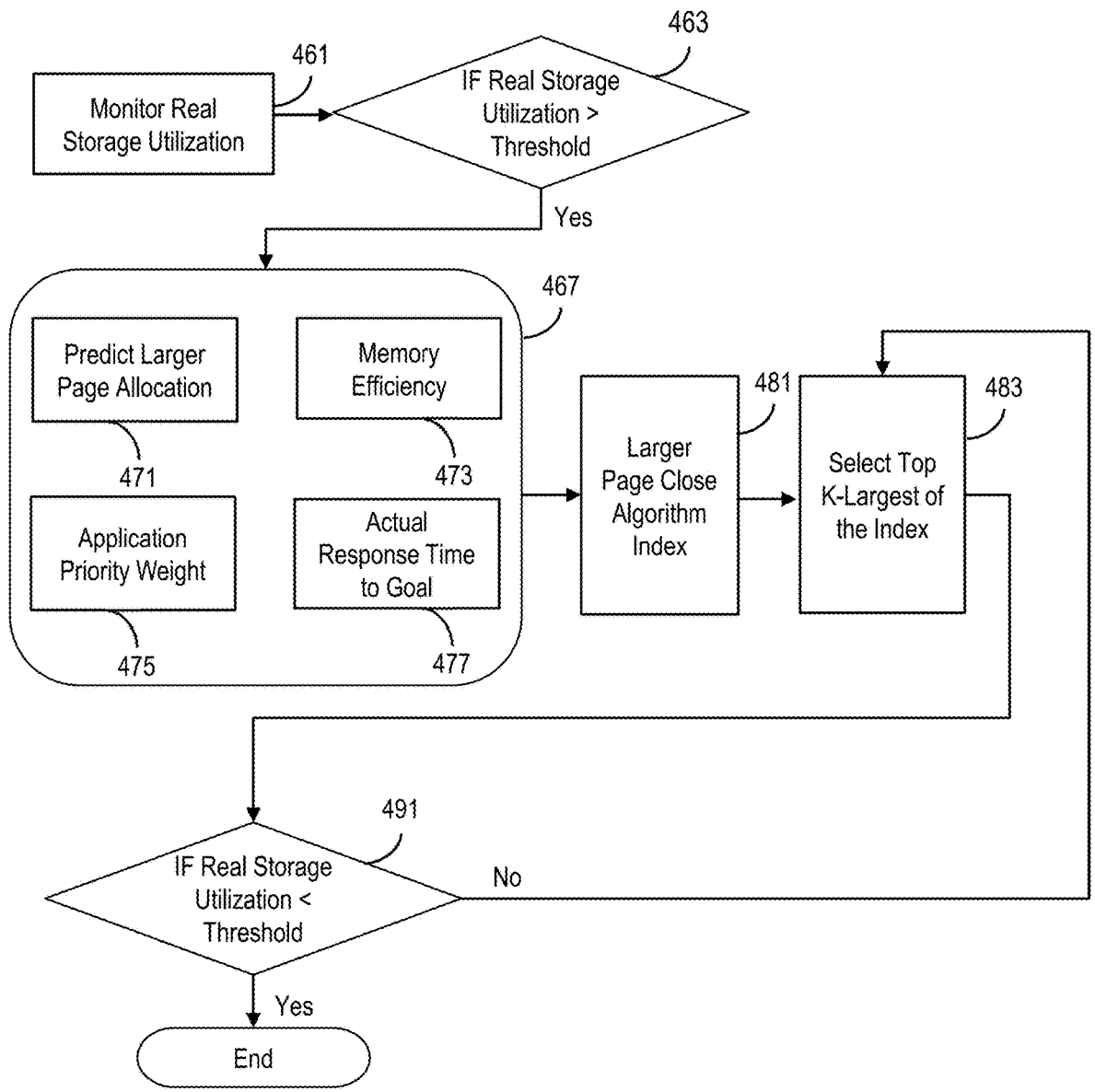
FIG. 4 shows a flowchart of an exemplary dynamic larger page management method in accordance with aspects of the present invention.

FIG. 4 shows a flowchart of an exemplary dynamic larger page management method in accordance with aspects of the present invention. Steps of the method may be carried out in the environment of FIG. 2 and are described with reference to elements depicted in FIG. 2. In embodiments, the steps of the method may include identifying and collecting runtime features (including resource access features) to sort/index applications of the OS and reduce resource utilization to below a threshold level (i.e., balancing larger pages utilization). The method may begin by monitoring real storage utilization 461 of applications of the OS that utilize larger pages. As the monitoring occurs, real storage utilization of the OS is checked against a threshold 463. Should the threshold utilization be exceeded, then the runtime workload manager 467 may be utilized in applying and training of ML models to predict larger pages allocations 471 among other factors, such as memory efficiency of the application 473, application priority weight 475, and actual response time to goal 477. The ML models are then used to determine and predict and set larger pages allocations 471 for similar applications and/or the same application. In exemplary embodiments, the ML model may be a linear regression ML model. These factors may be entered into an algorithm to index and sort the applications utilizing larger pages and each application may be tracked/managed using larger page close algorithm index 481 and selecting the K-largest 483 applications at the top of the index for selection to turn off use of larger pages. Finally, the real storage is checked to see if the real storage utilization is less than a threshold 491. If yes, the real storage utilization is now less than the threshold, then no action is taken and the method is ended. If no, the next application from the top (i.e., the next k-largest application) in the index is selected for turning off the larger page utilization. Each larger page application is turned off until the resource utilization is below the threshold.

Figure 5A:
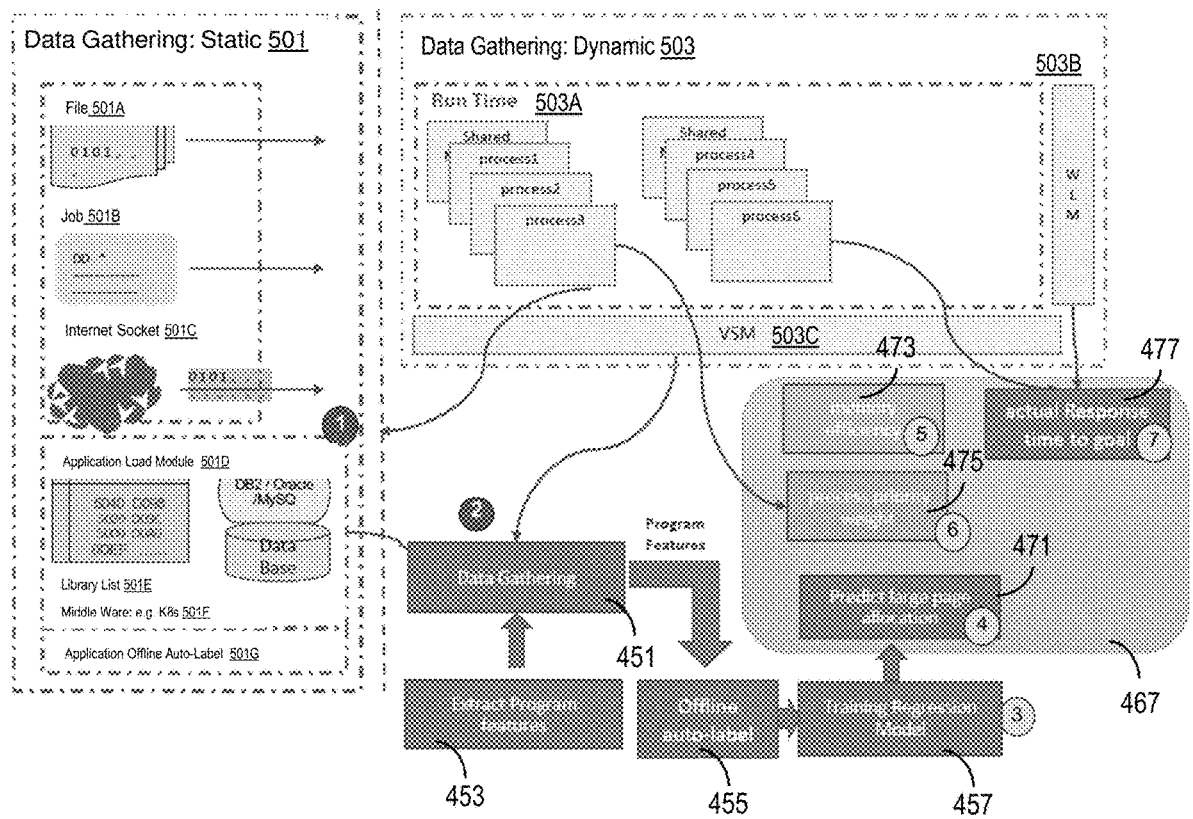
FIG. 5A shows a flowchart of an exemplary dynamic larger page management with a machine learning model training in accordance with aspects of the present invention.

FIG. 5A shows a flowchart of an exemplary dynamic larger page management with a machine learning model training in accordance with aspects of the present invention. In an exemplary embodiment, the system environment (noted as data gathering: static 501) for extracting the static application features includes gathering application features from data associated with files of the application 501A, jobs of the application 501B, internet socket communications information associated with the application 501C, an application load module 501D and any associated data including data from a library list 501E and any middle ware 501F being used, and application offline auto labeling 501G. The offline auto labeling 501G may include any previous labeling done for static application features in relation to runtime features including at least a TLB miss count, page-in/page-out, and/or real storage utilization. In exemplary embodiments, a compiler and binder are updated to gather these application features from the system environment.

In embodiments, once these static application features have been extracted, runtime data associated with the application is gathered dynamically as represented by "data gathering: dynamic 503". During runtime, the memory representations of the application include data from runtime processes 503A of the application, data from workload management (WLM) 503B), and data from a virtual storage manager (VSM) 503C may be utilized to gather the data from these runtime memory representations. The VSM manages storage allocation and responds to request to obtain free virtual storage, thereby placing the VSM in the best position to gather data associated with runtime memory representation of the application. The extracted application (i.e., program) features 453 and gathered data 451 from runtime contributes to the labeling by offline building auto label 455 to indicate key larger pages allocations during runtime and to train an ML model including regression modeling 457. The trained ML model can then be used to determine utilization of large pages by setting the larger page allocations. This labeling may occur automatically (i.e., automatic labeling) without the application being in runtime at the moment of labeling, i.e., offline, by analyzing a runtime history log with runtime features to identify label locations and times. In exemplary embodiments, the trained ML model 457 is used to predict larger page allocations. These predicted larger page allocations may be for applications that the training data is taken from, or for other applications being executed on the system. In any event, the trained ML model 457 predicting the larger page allocations establishes how larger pages are used.

Figure 5B:
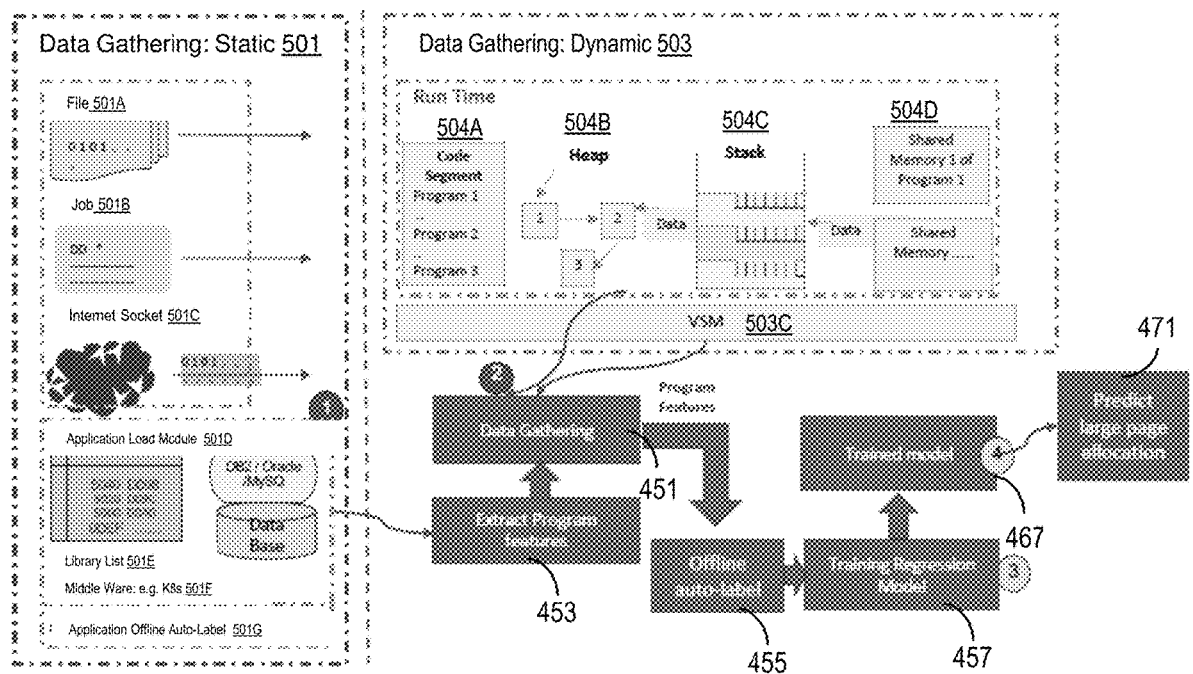
FIG. 5B shows a flowchart of an exemplary dynamic larger page management with a machine learning model training in accordance with aspects of the present invention.

FIG. 5B shows a flowchart of an exemplary dynamic larger page management with a machine learning model training in accordance with aspects of the present invention. In an exemplary embodiment, the system environment (noted as data gathering: static 501) for extracting the static application features includes gathering application features from data associated with files of the application 501A, jobs of the application 501B, internet socket communications information associated with the application 501C, an application load module 501D and any associated data including data from a library list 501E and any middle ware 501F being used, and application offline auto labeling 501G. The offline auto labeling 501G may include any previous labeling done for static application features in relation to runtime features including at least a TLB miss count, page-in/page-out, and/or real storage utilization. In exemplary embodiments, a compiler and binder are updated to gather these application features from the system environment.

In embodiments, once these static application features have been extracted, runtime data associated with the application is gathered dynamically as represented by "data gathering: dynamic 503". During runtime, the memory representations of the application include data from code segments 504A of the application, heap usage of the application 504B, stack usage of the application 504C, and shared memory utilization 504D by different programs (i.e., applications). In exemplary embodiments, a virtual storage manager (VSM) 503C may be utilized to gather the data 451 from these runtime memory representations. The VSM 503C manages storage allocation and responds to request to obtain free virtual storage, thereby placing the VSM 503C in the best position to gather data associated with runtime memory representation of the application. The extracted application features 453 and gathered data 451 from runtime contributes to the labeling by offline building auto label 455 to indicate key TLB miss counts during runtime and the use a concatenated application feature and labeled runtime feature to train an ML model including regression modeling 457. The trained ML model can then be used to determine utilization of large pages by setting the TLB miss thresholds to the labeled TLB miss counts. This labeling may occur automatically without the application being in runtime at the moment of labeling, i.e., offline, by analyzing a runtime history log with runtime features to identify label locations and times (i.e., the TLB miss count and when the TLB miss count occurred). In exemplary embodiments, the trained ML model 457 is used to predict larger page allocations. These predicted larger page allocations may be for applications that the training data is taken from, or for other applications being executed on the system. In any event, the trained ML model 457 predicting the larger page allocations establishes how larger pages are used.

As changes occur during runtime, the trained ML model 457 may dynamically tune (i.e., set) the larger pages allocation based on the modeling by the ML model 457. The ML model 457 may utilize newly gathered data during runtime that results in different larger pages allocations. For example, when more applications are used simultaneously, memory utilization goes up and the ML model 457 may change larger page allocations for each application, thereby making memory utilization more efficient.

FIG. 6 shows a flowchart showing the vectorization of identified application features of an exemplary method in accordance with aspects of the present invention. Steps of the method may be carried out in the environment of FIG. 2 and are described with reference to elements depicted in FIG. 2. In embodiments, the feature vectorization module 221 of FIG. 2 may be utilized to process each of the steps in the vectorization flowchart. The application load module 601 loads the application for analysis by the application features module 420 which identifies application features. The identified features 603 are then analyzed and encoded with feature engineering 605 to output a vectorized form 607 of the identified features 603. In embodiments, this vectorized form 607 is data that is easily digestible by a ML model.

In embodiments, the advantages to the dynamic tuning of larger pages may include less memory waste and improved performance of the runtime system. By utilizing larger pages when needed, memory consumption is minimal and performance is increased when needed at appropriate times. Further, dynamically tuning larger pages avoids the need for experienced users and system administrator interference to initiate the larger pages runtime option.

In embodiments, a service provider could offer to perform the processes described herein. In this case, the service provider can create, maintain, deploy, support, etc., the computer infrastructure that performs the process steps of the invention for one or more customers. These customers may be, for example, any business that uses applications that heap memory management during runtime of the application. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer 101 of FIG. 1, can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer 101 of FIG. 1, from a computer readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
monitoring, by a processor set, a resource utilization of an operating system (OS) with applications utilizing larger pages;
training, by the processor set, a machine learning (ML) model to determine a larger pages allocation based on applications features that are set for the applications during a runtime operation for the larger pages;
determining, by the processor set, the monitored resource utilization is greater than a threshold resource utilization based on the trained ML model determining that a runtime log history for the application indicates that less memory resources are accessed during the runtime operation in comparison to previous runtime operations and a storage utilization is below a predetermined utilization, and the storage utilization is different from the monitored resource utilization;
in response to the determining the monitored resource utilization is greater than a threshold resource utilization, determining, by the processor set, a respective larger pages index value for each of the applications utilizing larger pages; and
turning off, by the processor set, larger pages utilization of a subset of the applications utilizing larger pages, wherein the subset comprises a predefined number of the applications utilizing larger pages that have highest determined larger pages index values.

2. The method of claim 1, further comprising decreasing the larger pages allocation in response to the determining the monitored resource utilization is greater than the threshold resource utilization,
wherein the determining the respective larger pages index value comprises using a larger pages close algorithm that is based on a predicted larger pages allocation of an application, a priority weight of the application, a memory efficiency of the application, and a response time to goal of the application.

3. The method of claim 2, further comprising:
determining an order from which application use of the larger pages is turned off by utilizing a larger page close algorithm order which emphasizes the priority weight of the application;
identifying a feature of an application;
collecting data associated with the feature; and
labeling the feature automatically with the predicted larger pages allocation.

4. The method of claim 2, further comprising:
selecting, based on the determined larger pages index values, another application of the applications to turn off larger pages which reduces the resource utilization of the OS.

5. The method of claim 2, wherein the feature includes a static application feature and a runtime feature during a runtime of the application.

6. The method of claim 5, wherein the application features comprises the static application feature and the runtime feature.

7. The method of claim 6, further comprising:
identifying the static application features of the application;
vectorizing the static application features; and
training the ML model with the vectorized static application features.

8. The method of claim 6, further comprising:
training the ML model to dynamically manage larger pages lifecycle of the applications.

9. The method of claim 5, wherein:
the runtime feature includes data associated with one or more selected from a group consisting of: a page-in/page-out rate; a real storage utilization; a central processing unit (CPU) utilization; a CPU time; a translation lookaside buffer (TLB) miss count; and the larger pages allocation; and
the static application features include data associated with one or more selected from a group consisting of: external functions; programming languages; application size; compiler version; middle ware; database access; application loop count; application branch counts; application call chain counts; input/output resource access; network resource access; number of threads; and heap latch contention.

10. A computer program product comprising one or more computer readable storage media having program instructions collectively stored on the one or more computer readable storage media, the program instructions executable to:
identify a feature of an application;
label the feature of the application automatically with a larger pages allocation;
predict the larger pages allocation by training a machine learning (ML) model based on the feature that is set for the application during a runtime operation for larger pages;
build an index of applications utilizing the larger pages of an operating system (OS), the index including the applications and corresponding larger pages allocations, wherein one of the applications corresponds to the predicted larger pages allocation;
determine a threshold resource utilization has been exceeded based on the trained ML model determining that a runtime log history for the application indicates that less memory resources are accessed during the runtime operation in comparison to previous runtime operations and a storage utilization is below a predetermined utilization, and the storage utilization is different from the threshold resource utilization; and
select, based on a rule, a subset of the applications to turn off larger pages which reduces the resource utilization of the OS.

11. The computer program product of claim 10, wherein the program instructions are further executable to decrease the larger pages allocation in response to the determining that the threshold resource utilization has been exceeded,
wherein the ML model includes a regression learning model.

12. The computer program product of claim 10, wherein the program instructions are further executable to determine an order from which application use of the larger pages is turned off by utilizing a larger page close algorithm order which emphasizes a priority weight of the application,
wherein the index includes the predicted larger pages allocation of the one of the applications, the priority weight of the one of the applications, a memory efficiency of the one of the applications, and a response time to goal of the one of the applications.

13. The computer program product of claim 12, wherein the program instructions are executable to:
in response to the determining the threshold resource utilization is exceeded, determine a respective larger pages index value for each of the applications utilizing larger pages, wherein the determining the respective larger pages index value comprises using a larger pages close algorithm that is based on the predicted larger pages allocation, the priority weight, the memory efficiency, and a response time to goal.

14. A system comprising:
a processor set, one or more computer readable storage media, and program instructions collectively stored on the one or more computer readable storage media, the program instructions executable to:
identify static application features of an application;
identify runtime features of the application;
collect data associated with the runtime features during runtime of the application;
predict a larger pages allocation by applying a trained machine learning (ML) model to determine a larger pages allocation based on the static applications features and the runtime features that are set for the application during a runtime operation for larger pages, the ML model is being trained based on other static application features and other runtime features of another application;
build an index of applications utilizing the larger pages of an operating system (OS), the index including the applications and corresponding larger pages allocations, wherein one of the applications corresponds to the predicted larger pages allocation;
determine a threshold resource utilization has been exceeded based on the trained ML model determining that a runtime log history for the application indicates that less memory resources are accessed during the runtime operation and a storage utilization is below a predetermined utilization; and
select, based on a rule, a subset of the applications to turn off larger pages which reduces the resource utilization of the OS.

15. The system of claim 14, wherein the program instructions are executable to decrease the larger pages allocation in response to the threshold resource utilization being exceeded,
wherein the index includes the predicted larger pages allocation of the one of the applications, a priority weight of the one of the applications, a memory efficiency of the one of the applications, and a response time to goal of the one of the applications.

16. The system of claim 15, wherein the program instructions are executable to:
determine an order from which application use of the larger pages is turned off by utilizing a larger page close algorithm order which emphasizes the priority weight of the application;
in response to the determining the threshold resource utilization is exceeded, determine a respective larger pages index value for each of the applications utilizing larger pages, wherein the determining the respective larger pages index value comprises using a larger pages close algorithm that is based on the predicted larger pages allocation, the priority weight, the memory efficiency, and a response time to goal.

17. The system of claim 14, wherein the threshold resource utilization includes real storage utilization of the OS.

18. The system of claim 14, wherein the static application features include data associated with one or more selected from a group consisting of:
external functions;
programming languages; application size; compiler version;
middleware;
database access;
application loop count;
application branch counts;
application call chain counts;
input/output resource access;
network resource access;
number of threads; and
heap latch contention.

19. The system of claim 14, wherein the runtime features include data associated with one or more selected from a group consisting of:
a page-in/page-out rate; a real storage utilization;
a central processing unit (CPU) utilization; a CPU time;
a translation lookaside buffer (TLB) miss count; and
the larger pages allocation.

20. A method, comprising:
identifying, by a processor set, static application features of an application;
identifying, by the processor set, runtime features of the application;
collecting, by the processor set, data associated with the runtime features during runtime of the application;
predicting, by the processor set, a larger pages allocation of the application by applying a machine learning (ML) model, the ML model being trained to determine a larger pages allocation based on other static applications features and other runtime features that are set for another application during a runtime operation for larger pages;
monitoring, by the processor set, a resource utilization of an operating system (OS) with applications utilizing the larger pages;
building, by the processor set, an index of the applications utilizing larger pages on the OS, the index including the applications and the predicted larger pages allocation, wherein one of the applications corresponds to the larger pages allocation;
determining, by the processor set, a threshold resource utilization has been exceeded by the monitored resource utilization based on the trained ML model determining that a runtime log history for the application indicates that less memory resources are accessed during the runtime operation and a storage utilization is below a predetermined utilization; and
balancing, by the processor set, utilization of the larger pages by selecting, based on a rule, a subset of the applications to turn off larger pages which reduces the resource utilization of the OS.

21. The method of claim 20, further comprising decreasing the larger pages allocation in response to the determining that the threshold resource utilization has been exceeded by the monitored resource utilization, wherein the index includes the predicted larger pages allocation of the application, a priority weight of the application, a memory efficiency of the application, and a response time to goal of the application.

22. The method of claim 21, further comprising:

determining an order from which application use of the larger pages is turned off by utilizing a larger page close algorithm order which emphasizes the priority weight of the application; and in response to the determining the threshold resource utilization is exceeded, determine a respective larger pages index value for each of the applications utilizing larger pages, wherein the determining the respective larger pages index value comprises using a larger pages close algorithm that is based on the predicted larger pages allocation, the priority weight, the memory efficiency, and a response time to goal.

23. The method of claim 22, wherein the threshold resource utilization includes real storage utilization of the OS.

24. A method, comprising:

monitoring, by a processor set, a resource utilization of an operating system (OS) with applications utilizing larger pages;

training, by the processor set, a machine learning (ML) model to determine a larger pages allocation based on applications features that are set for the applications during a runtime operation for the larger pages;

building, by the processor set, an index of the applications utilizing the larger pages on the OS, the index including applications and a corresponding predicted larger pages allocation, wherein one of the applications corresponds to the predicted larger pages allocation, and the index includes the predicted larger pages allocation, a priority weight of the one of the applications, memory efficiency of the one of the applications, and response time to goal of the one of the applications;

determining, by the processor set, a threshold resource utilization including a real storage utilization of the OS has been exceeded by the monitored resource utilization based on the trained ML model determining that a runtime log history for the application indicates that less memory resources are accessed during the runtime operation in comparison to previous runtime operations and a storage utilization is below a predetermined utilization, and the storage utilization is different from the monitored resource utilization;

in response to the determining the threshold resource utilization is exceeded, determining, by the processor set, a respective larger pages index value for each of the applications utilizing larger pages, wherein the determined respective larger pages index value comprises using a larger pages close algorithm that is based on the predicted larger pages allocation, the priority weight, the memory efficiency, and a response time to goal; and turning off, by the processor set, larger pages utilization of a subset of the applications based on a rule, the rule selecting the subset of the applications which reduces the resource utilization of the OS.

25. The method of claim 24, wherein the application features comprise a static application feature and a runtime feature of the applications.

* * * * *